United States Patent [19]

Staar

[11] 3,872,508

[45] Mar. 18, 1975

[54] RETENTION ROLLER HOLDING MECHANISM FOR TAPE CARTRIDGE PLAYBACK APPARATUS

[75] Inventor: Theophiel Clement Jozef Lodewijk Staar, Kraainem, Belgium

[73] Assignee: Staar, S.A., Brussels, Belgium

[22] Filed: Jan. 24, 1973

[21] Appl. No.: 326,528

[52] U.S. Cl. .......... 360/137
[51] Int. Cl. .......... G11b 5/00
[58] Field of Search .......... 360/92, 93, 137, 94–96

[56] References Cited

UNITED STATES PATENTS

| | | | |
|---|---|---|---|
| 3,599,985 | 8/1971 | Huber | 360/93 |
| 3,633,922 | 1/1972 | Yokota | 360/93 |
| 3,759,530 | 9/1973 | Sampei | 360/93 |
| 3,762,721 | 10/1973 | Corso et al. | 360/93 |

*Primary Examiner*—Terrell W. Fears
*Assistant Examiner*—Robert S. Tupper
*Attorney, Agent, or Firm*—Wolfe, Hubbard, Leydig, Voit & Osann

[57] ABSTRACT

A playback mechanism for a magnetic tape contained in a cartridge having the tape exposed in one end thereof and having a slot in a lateral face, the mechanism including a housing for receiving the cartridge which is inserted inwardly in endwise relation into operative position, a slidable element that is moved inwardly as the cartridge is inserted, a retention roller resiliently mounted to act generally perpendicularly to the lateral space for holding the cartridge in its operative position, the element having a surface for holding the retention roller out of contact with the cartridge until the cartridge approaches its operative position wherein it is released to contact the slot and hold the cartridge in its operative position.

7 Claims, 3 Drawing Figures

PATENTED MAR 18 1975 3,872,508

RETENTION ROLLER HOLDING MECHANISM FOR TAPE CARTRIDGE PLAYBACK APPARATUS

The present invention relates generally to playback mechanisms for magnetic tapes stored in cartridges and, more particularly to mechanisms for playing back cartridges of the "continuous loop" type wherein the tape is exposed along one of its end faces for cooperation with the sound head and driving elements of the mechanism.

Playback mechanisms for handling cartridges with the tape exposed along one of the end faces, commonly called the "active face" generally require that the cartridge be inserted therein with a sliding motion along its main plane with the active face forward so that when the cartridge is completely inserted into its operative position, the active face comes into cooperative engagement with the sound head and driving elements for the tape. The driving of the tape results from the cooperation of a rotating spindle, called a capstan in the playback mechanism and a pressure roller, generally made of rubber and contained within the cartridge behind the tape to enable the capstan to press against the roller and drive the tape when the capstan is rotated.

During insertion by the sliding motion, the cartridge usually engages a roller or other element along one of its lateral faces in the housing, the roller being subject to the action of a resilient member which works substantially perpendicular to the direction of the sliding motion of the cartridge. The roller acts on the forward inclined surface of a V-shaped slot located in the lateral face of the cartridge and, through the action of the resilient member, the roller will be forced into the slot when the cartridge approaches its operative position and will thereafter exert an inward bias or pressure on the cartridge to maintain the tape in contact with the sound head and driving elements for the tape to insure that the tape is positively pinched between the driving capstan and the pressure roller to drive the tape at a constant speed. It should be understood that slippage of the tape by the capstan would result in inferior fidelity of the recording on the tape.

Many conventional playback mechanisms are fabricated so that the cartridge is inserted through an opening in a lateral wall of the mechanism housing, so that during insertion of the cartridge, the roller and resilient member must be moved outwardly by the cartridge until it approaches its operative position wherein the roller will engage the V-shaped slot in the lateral face. Many cartridges have a slope in the lateral face near the active face so that the roller and resilient member will be gradually moved outwardly by the cartridge as it is inserted. Thus, the cartridge is retained in operative position by the roller and may be inserted and withdrawn from the mechanism by simply pushing it in and pulling it out of the housing.

A disadvantage of such mechanisms lies in the fact that when a cartridge is inserted, additional energy is necessary for opposing the action of the roller and resilient member during insertion and therefore undesirable resistance to cartridge insertion is present which is often unappealing to the users of such mechanisms.

Accordingly, a primary object of the present invention is to provide a playback mechanism for the above described cartridges which does not have such undesirable resistance to cartridge insertion, and which is achieved without affecting the proper retention of the cartridge when it is in operative position.

Another closely related object lies in the provision for permitting relatively resistance free insertion of the cartridge substantially through the complete course of its travel to its operative position.

Yet another object of the present invention is to provide a playback mechanism having such desirable characteristics which are achieved through the use of relatively few moving parts, thereby enabling its economical manufacture.

A more specific object of the present invention lies in the provision of eliminating the necessity for opposing the action of the resilient member having the roller attached thereto during the course of cartridge insertion, the resilient member acting upon the cartridge only when it approaches its operative position within the housing.

Other objects and advantages of the present invention will become apparent upon reading the following detailed description, while referring to the attaching drawings, in which.

Figure 1:
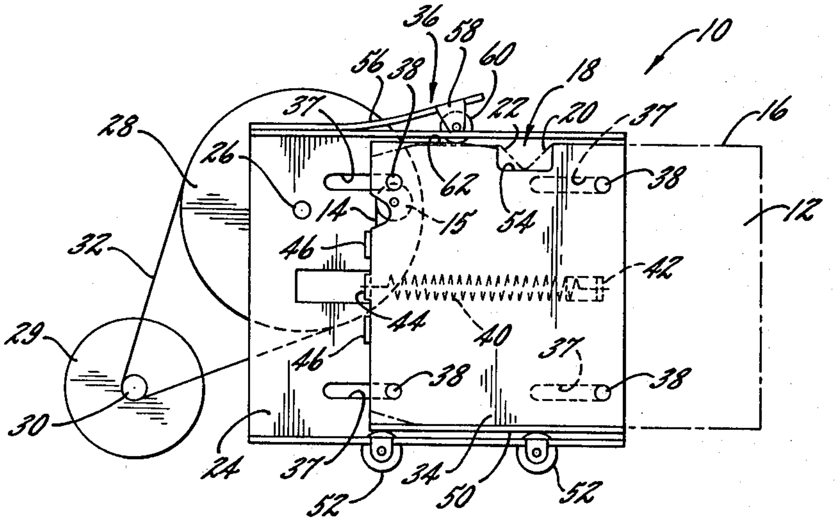
FIG. 1 is a plan view of a mechanism embodying the present invention and showing a cartridge only partially inserted therein in phantom, i.e., the cartridge is in its operative position.

While the present invention will be described herein with certain preferred embodiments, it will be understood that the invention is intended to encompass all alternatives, modifications and equivalents that may be included within the spirit and scope of the invention as expressed in the appended claims.

Turning now to the drawings, a playback mechanism embodying the present invention and indicated generally at 10 and is shown together with a cartridge 12 (shown in phantom) which has an endless tape 14 therein which is exposed at the inward end face as shown. A backup roller 15 is located behind the exposed portion of the tape positioned to support the tape so that when the cartridge is in its operative position the tape will be positively pinched between the backup roller and the driving capstan. The cartridge has a lateral face 16 in which the V-shaped slot 18 comprising inclined surfaces 20 and 22 is located.

In keeping with the present invention, the playback mechanism 10 has a main frame 24 journaling a rotating capstan 26 which is fixed to a fly wheel 28 driven by a motor 29 and pulley 30 by means of a belt 32.

Broadly stated, the mechanism embodying the present invention is characterized by the inclusion of a movable element or plate 34 which is adapted to be driven by the cartridge 12 during its insertion, the edge surface 62 of which is substantially aligned with the lateral face 16 of the cartridge at its forward portion and thus is adapted to hold a retention member 36 out of contact with a cartridge until the cartridge approaches its operative position wherein the capstan contacts the exposed portion of the tape 14 and presses it against the back up roller 15.

To permit the sliding motion of the plate 34, the main frame has four elongated slots 37 in which pin members 38 are longitudinally slidable, the pin members also being suitably secured to the plate 34. It should therefore be understood that the plate 34 is movable through a distance corresponding to the length of the elongated slots 37 which are of suitable length so that the tape 14 may be moved into contact with the capstan 26. The plate 34 is normally biased in the position as shown in FIG. 1 by virtue of a spring 40 having one end attached to an ear 42 extending from the main frame 24, the other end being connecting to a corresponding ear 44 of the plate 34. The spring is normally in tension so that it biases the plate to the right as shown in FIG. 1.

Figure 2:
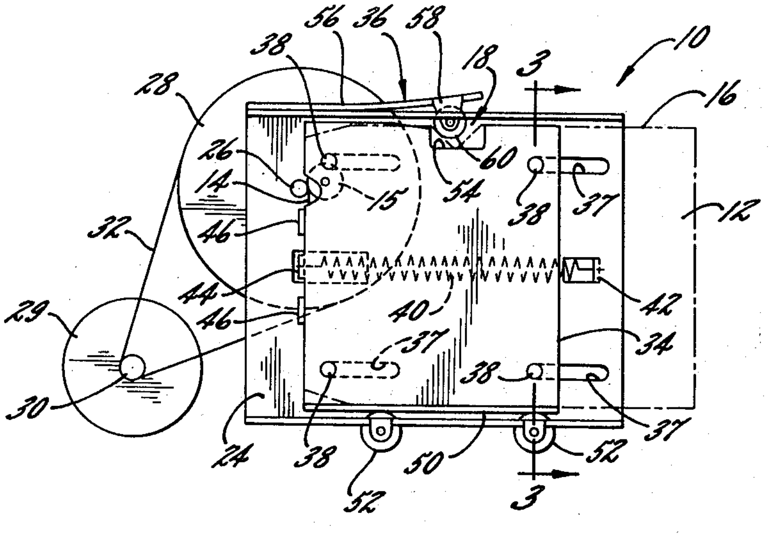
FIG. 2 is a plan view similar to FIG. 1, particularly illustrating the cartridge shown in phantom in its operative position; and, FIG. 3 is a vertical sectional view of the mechanism and cartridge taken generally along the line 3—3 of FIG. 2.

When the cartridge is to be inserted into its operative position shown in FIG. 2, the plate is moved to the left by virtue of the active face of the cartridge contacting one or more ears 46 that are generally perpendicular to the plane of the plate, so that during insertion of the cartridge into the apparatus, the cartridge will initially contact the plate in its first position shown in FIG. 1 and will thereafter move the plate to the left to its second position shown in FIG. 2 wherein the cartridge is in its operative position.

Figure 3:
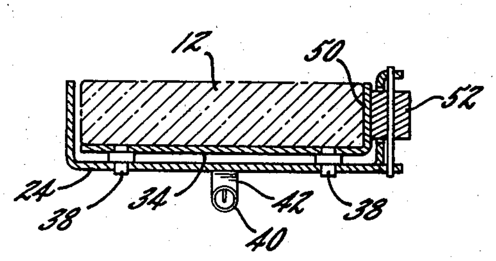

In accordance with an important aspect of the present invention, the plate has a perpendicular flange portion 50 as best shown in FIG. 3 that is adapted to engage the opposite lateral face of the cartridge face during its movement. The main frame may be provided with a pair of rollers 52 for contacting the outside surface of the flange portion 50 for facilitating the sliding motion of the plate during insertion of the cartridge 12 in the mechanism. The plate 34 includes a generally rectangular recess 54, the shape of which is not particularly critical except insofar as it is necessary that it be of sufficient depth that the retention member 36 will not be in contact with the plate when the cartridge is in its operative position.

In accordance with an important aspect of the present invention, the retention member 36 includes an elongated resilient or spring member 56 that is attached to the main frame 24 at one end thereof and a pair of legs 58 (only one of which is shown) for journaling a roller 60. The resilient spring member 56 is outwardly deflected as shown in FIG. 1 so that it exerts a force that is generally perpendicular to the lateral face 16 of the cartridge when the cartridge 12 is inserted within the mechanism. However, when the cartridge is in the position shown in FIG. 1, the retention member 36 is out of contact with it since, in such position, the roller 60 contacts the edge surface 62 of the plate 34. Thus, it should be understood that as the cartridge is inserted, it will move the plate to the left until the roller 60 reaches the recess 54 of the plate as the cartridge approaches its operative position and, at that time, the spring member 56 will cause the roller 60 to contact the inclined surface 22 of the slot 18 in the cartridge and will hold the cartridge in its opertive position wherein the capstan 26 pinches the tape 14 against the backup roller 15.

In keeping with the invention, the inclined surface 22 of the slot in the cartridge has the effect of producing a component of force to the left shown in FIG. 2 and thereby insures sufficient pressure is maintained by the capstan against the tape 14. The force of the spring member 56 should be of sufficient magnitude so that the component of force in the leftward direction on the cartridge is greater than the force of the spring 40 to insure that the tape is firmly held against the capstan during operation.

To remove the cartridge from the mechanism, the cartridge is merely pulled outwardly so that the roller 60 is moved out of the slot and in contact with the lateral edge surface 62. The force of the spring 40 is then sufficient to return the plate 34 to the right to its first position shown in FIG. 1 and the cartridge is easily removed.

Thus, a playback mechanism having many desirable features with respect to its operation as well as economy of manufacture has been described and which satisfies all of the aforementioned objects.

I claim as my invention:

1. A playback mechanism for a magnetic tape contained in a cartridge having the tape exposed in the forward end face thereof and having a V-shaped slot in a lateral face, said mechanism comprising a housing for receiving the cartridge which is inserted inwardly forward end face first into an operative position, resilient retention means inclduing a roller and means resiliently on the housing to act generally perpendicularly to and toward said lateral face of the cartridge to enter the V shaped slot for holding the cartridge in its operative position, and an element and means slidablly mounted said element on said housing and said element being engaged and moved by the cartridge from a first to a second position as the cartridge is inserted inwardly into its operative position, said element having a surface means substantially aligned with said lateral face of the cartridge at the forward end thereof which is engaged by said roller for holding said roller out of contact with the forward face of the cartridge and substantial engagement with a forward portion of the lateral face of the cartridge as the cartridge is inserted while allowing said roller to enter said V shaped slot when the cartridge approaches its operative position to resiliently hold the cartridge in its operative position.

2. A playback mechanism as defined in claim 1 wherein said element comprises a generally flat plate having one lateral edge surface which engages said retention roller and an attached flange against which the cartridge bears located on the opposite lateral edge of said plate, and wherein said housing carries rollers contacting said flange for facilitating the sliding movement of said plate.

3. A playback mechanism as defined in claim 1 wherein said element includes at least one generally perpendicular projection for contacting the forward end face of the cartridge having the exposed tape, such that when the cartridge is inserted and moved toward its operative position, the cartridge engages said projection and moves said element.

4. A playback mechanism as defined in claim 1, wherein said mechanism includes means for biasing said element toward its first position.

5. A playback mechanism as defined in claim 1 wherein said surface means of said element extends generally beyond the lateral face of the cartridge containing the V-shaped slot therein and having an indentation adjacent said slot so that when said cartridge is in operative position, said retention means enters the cartridge slot and is out of contact with said element.

6. A playback mechanism as defined in claim 1 wherein said resilient retention means comprises an elongated spring member having one end attached to said housing and a roller secured to its opposite free end, said spring member normally biasing said roller toward said element so that the roller enters said V-shaped cartridge slot when said cartridge is in its operative position.

7. Apparatus as defined in claim 6 wherein the V shaped slot includes an inclined surface for contacting said roller when the cartridge is in its operative position, said inclined surface being effective to direct a component of force for urging the cartridge inwardly of the mechanism.

* * * * *